(12) United States Patent
Pechler

(10) Patent No.: US 6,870,280 B2
(45) Date of Patent: Mar. 22, 2005

(54) VERTICAL-AXIS WIND TURBINE

(76) Inventor: Elcho R. Pechler, 573 Jason Dr., Debary, FL (US) 32713

( * ) Notice: Subject to any disclaimer, the term of this patent is extended or adjusted under 35 U.S.C. 154(b) by 0 days.

(21) Appl. No.: 10/141,160

(22) Filed: May 8, 2002

(65) Prior Publication Data
US 2003/0209911 A1 Nov. 13, 2003

(51) Int. Cl.$^7$ ................................. F03D 3/04
(52) U.S. Cl. .......................... 290/55; 290/44
(58) Field of Search ................ 290/44, 55; 415/186, 415/203

(56) References Cited

U.S. PATENT DOCUMENTS

| | | | | |
|---|---|---|---|---|
| 588,572 | A | * 8/1897 | Hardaway | .............. 415/4.2 |
| 1,595,578 | A | * 8/1926 | Sovereigh | .............. 415/186 |
| 3,938,907 | A | * 2/1976 | Magoveny et al. | ......... 415/141 |
| 3,994,621 | A | 11/1976 | Bogie | |
| 4,260,325 | A | * 4/1981 | Cymara | .............. 415/4.4 |
| 4,269,563 | A | 5/1981 | Sharak et al. | |
| 4,313,710 | A | * 2/1982 | La Ferte | .............. 415/4.2 |
| 4,457,666 | A | * 7/1984 | Selman, Jr. | .............. 415/203 |
| 4,486,143 | A | 12/1984 | McVey | |
| 4,551,631 | A | * 11/1985 | Trigilio | .............. 290/55 |
| 5,126,584 | A | 6/1992 | Ouellet | |
| 5,380,149 | A | 1/1995 | Valsamidis | |
| 5,391,926 | A | 2/1995 | Staley et al. | |
| 5,454,694 | A | * 10/1995 | O'Dell | .............. 416/197 A |
| 5,463,257 | A | 10/1995 | Yea | |
| 5,852,331 | A | * 12/1998 | Giorgini | .............. 290/55 |
| 6,015,258 | A | * 1/2000 | Taylor | .............. 415/4.4 |
| 6,465,899 | B2 | * 10/2002 | Roberts | .............. 290/44 |
| 6,705,838 | B1 | * 3/2004 | Bak et al. | .............. 416/243 |

FOREIGN PATENT DOCUMENTS

| | | | | |
|---|---|---|---|---|
| DE | 2740235 A | * 3/1979 | ............ | F03D/3/04 |
| DE | 2918181 A | * 11/1979 | ............ | F03D/3/04 |
| EP | 957265 A2 | * 11/1999 | ............ | F03D/3/04 |
| GB | 2100687 A | * 1/1983 | ............ | F03D/11/00 |
| GB | 2100688 A | * 1/1983 | ............ | F03D/11/00 |
| GB | 2146572 A | * 4/1985 | ............ | B29C/33/52 |
| JP | 2000337244 A | * 12/2000 | ............ | F03D/3/00 |
| PT | 71735 A | * 2/1981 | ............ | F03D/0/00 |
| WO | WO 9119093 A1 | * 12/1991 | ............ | F03D/3/04 |

* cited by examiner

Primary Examiner—Joseph Waks
(74) Attorney, Agent, or Firm—Dale J. Ream

(57) ABSTRACT

A vertical-axis wind turbine includes upper and lower hubs defining an imaginary vertical axis therebetween. A rotor assembly is rotatably coupled to the hubs and includes a plurality of rotor blades. Each rotor blade includes an annular configuration having a first vertical edge perpendicular to a radial edge of the rotor assembly and a second vertical edge spaced inwardly toward the imaginary vertical axis. No rotor blade touches any other blade and an airflow is obstructed only by respective rotor blades when passing through the rotor assembly. A plurality of stationary stator blades are circumferentially arranged about the rotor assembly, each stator blade being positioned tangentially to the rotor assembly such that air that would cause propulsion relative to the rotor blades is unrestricted whereas air that would cause drag is blocked. A plurality of rotor assemblies may be included within a single housing.

18 Claims, 14 Drawing Sheets

VERTICAL-AXIS WIND TURBINE

BACKGROUND OF THE INVENTION

This invention relates generally to wind turbines and, more particularly, to a vertical-axis wind turbine that arranges stationary and rotor blades so as to harness and utilize a properly directed airflow while restricting an improperly directed airflow and eliminating inefficient internal airflow restrictions.

Harnessing wind energy and converting it to mechanical or electric energy has long been considered to be a promising source of energy generation. In fact, many devices have been proposed for harnessing wind for this purpose. Wind turbines are generally placed into two categories: horizontal-axis turbines (propeller windmills) which operate directly into the wind and turn about a horizontal axis and vertical-axis turbines which harness columns of air to turn rotor blades rotating about a vertical axis. Although each type of wind turbine has advantages and disadvantages, existing devices do not provide the proper arrangement of stationary and rotational blades and internal structures that make converting wind energy to electric energy feasible.

Therefore, it is desirable to have a vertical-axis wind turbine that tangentially directs an airflow to a rotor assembly so that an airflow that will provide sail-type propulsive force is unrestricted and an airflow that will cause drag is blocked. Further, it is desirable to have a vertical-axis wind turbine having no center vertical shaft so that an airflow is allowed to flow unobstructed through the center of a rotor assembly. It is also desirable to have a wind turbine in which the rotor blades include an angular configuration that optimally balances sail propulsion and lift effects.

SUMMARY OF THE INVENTION

A vertical-axis wind turbine according to the present invention includes a rotor assembly having top and bottom plates pivotally connected to upper and lower bearing hubs for rotation about an imaginary vertical axis extending between the bearing hubs. The bearing hubs themselves are positioned within the turbine housing. The rotor assembly includes a plurality of rotor blades, each rotor blade having a generally annular configuration and being positioned so as not to contact any other rotor blade. Each rotor blade includes one vertical edge adjacent to the radial edge of the top and bottom plates of the rotor assembly and a second vertical edge extending toward the imaginary vertical axis. However, each rotor blade stops short of the axis such that the rotor assembly defines an open center space through which an airflow may pass without obstruction or resistance.

The wind turbine further includes a plurality of stationary stator blades arranged about the circumference of the rotor assembly, each stator blade being positioned in a tangential relationship relative to the rotor assembly. This configuration only allows air to enter the rotor assembly that will impact the propulsion side of respective rotor blades like a sail or to be diverted to such a rotor blade. Air flowing in a direction that would cause drag on the rotor blades is blocked. Of course, air flowing in the proper direction will sometimes flow to the backside of a rotor blade due to the constant rotation of the rotor assembly; this is acceptable as such an airflow provides a propulsive lift effect. Therefore, the rotor assembly as a whole may provide both sail and lift types of propulsion.

Therefore, a general object of this invention is to provide a vertical-axis wind turbine that includes a rotator assembly having no center shaft such that an airflow may pass therethrough without obstruction or resistance.

Another object of this invention is to have a wind turbine, as aforesaid, having a plurality of stationary stator blades arranged circumferentially about the rotor assembly with each stator blade being positioned tangentially relative to the rotor assembly for permitting or restricting airflow from certain directions.

Still another object of this invention is to have a wind turbine, as aforesaid, in which each of a plurality of rotor blades includes an airfoil configuration which may act as an airfoil or sail depending on an angle of an incoming airflow.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

A vertical-axis wind turbine according to the present invention will now be described in detail with reference to FIGS. 1 through 14 of the accompanying drawings.

Figure 1:
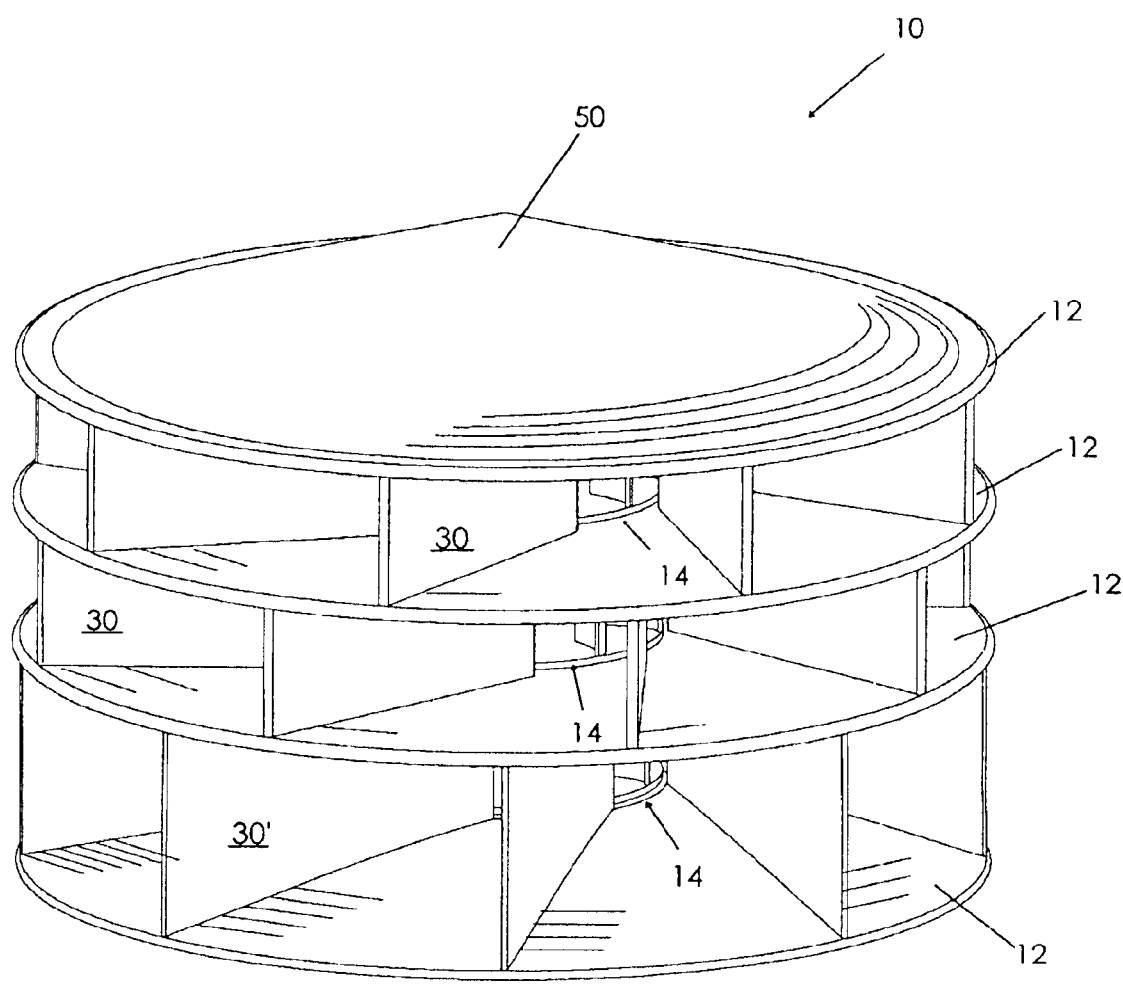
FIG. 1 is a perspective view of a vertical-axis wind turbine according to one embodiment of the present invention.
Figure 2:
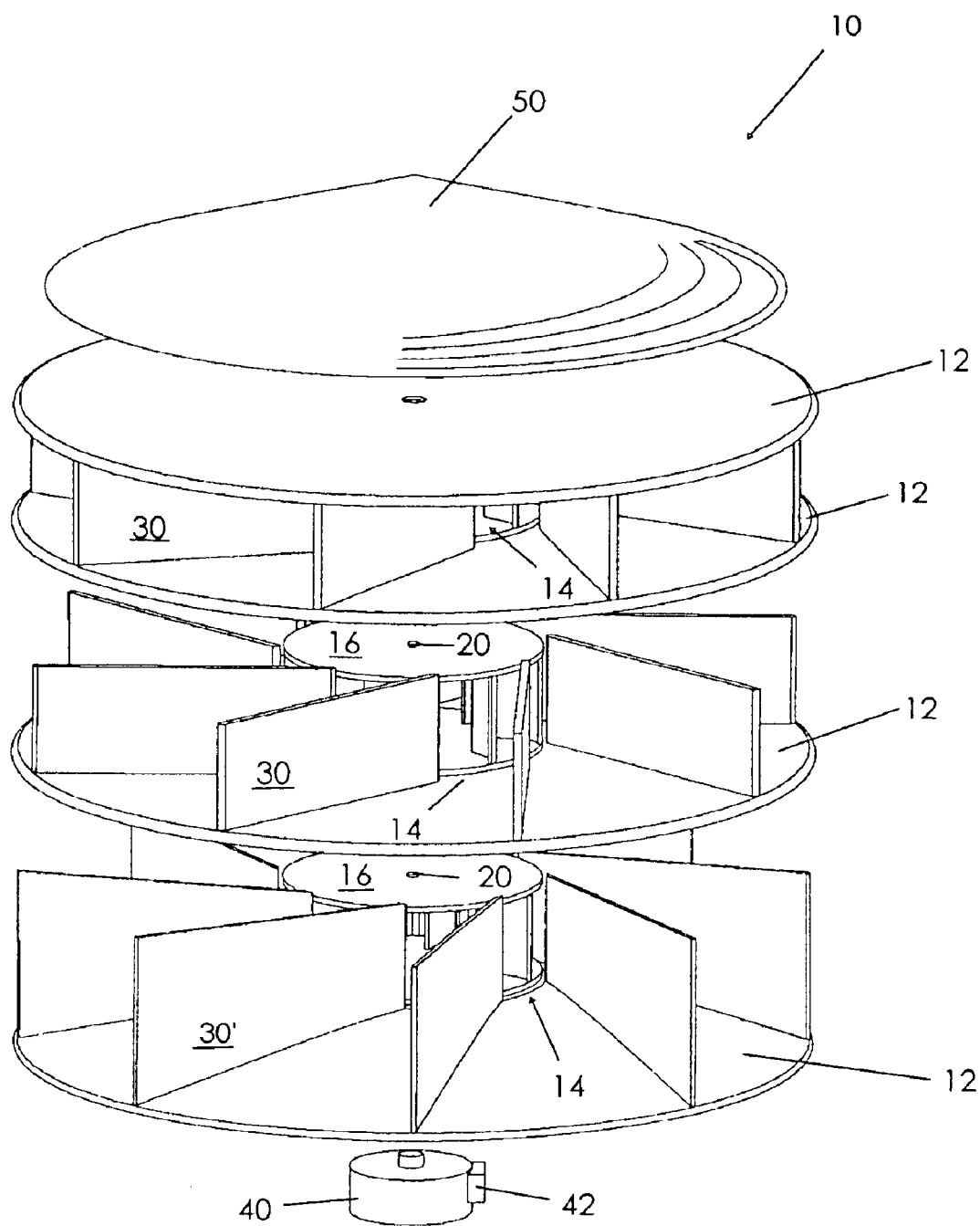
FIG. 2 is an exploded view of the wind turbine as in FIG. 1.
Figure 3:
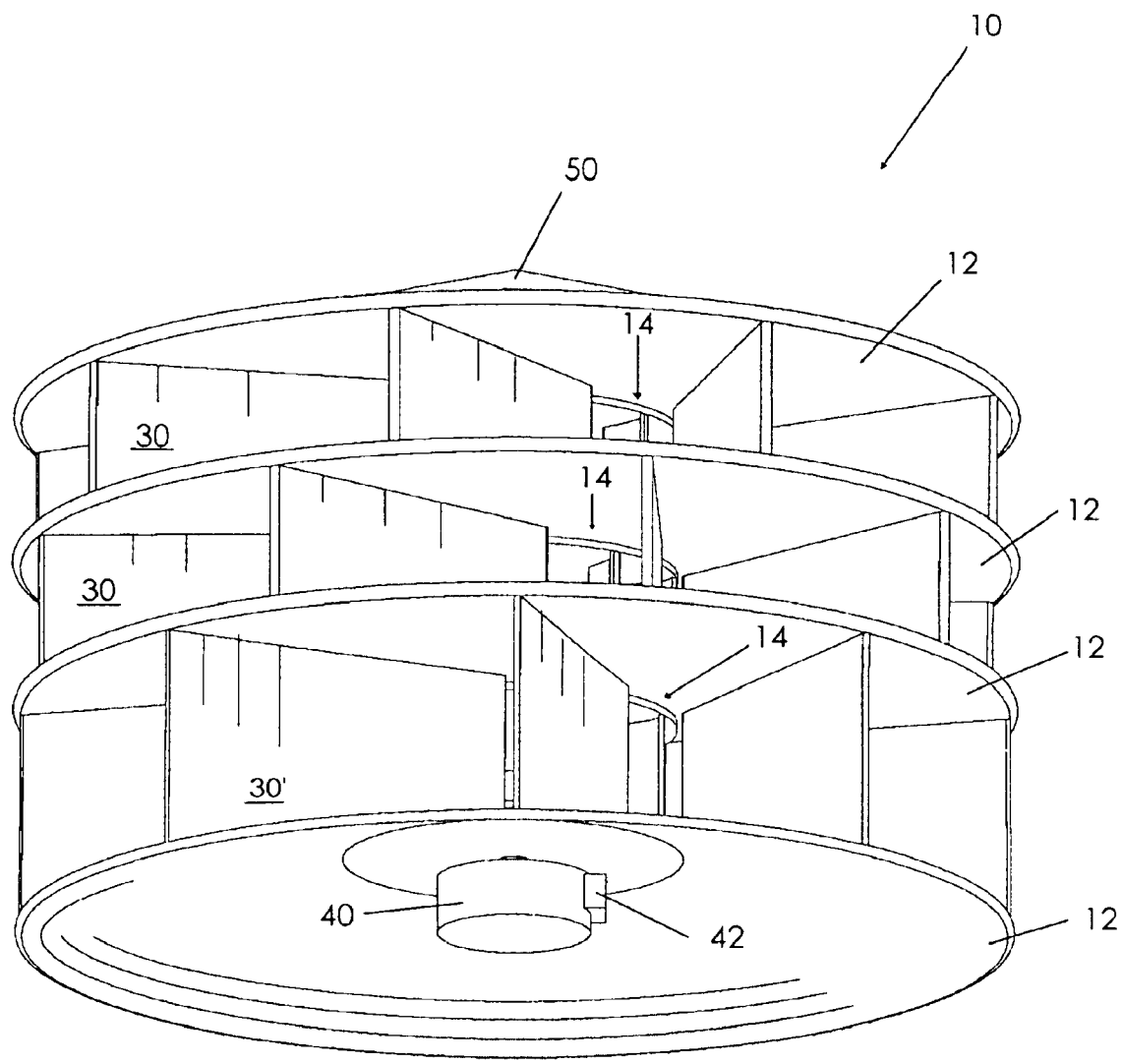
FIG. 3 is a bottom perspective view of the wind turbine as in FIG. 1.
Figure 5:
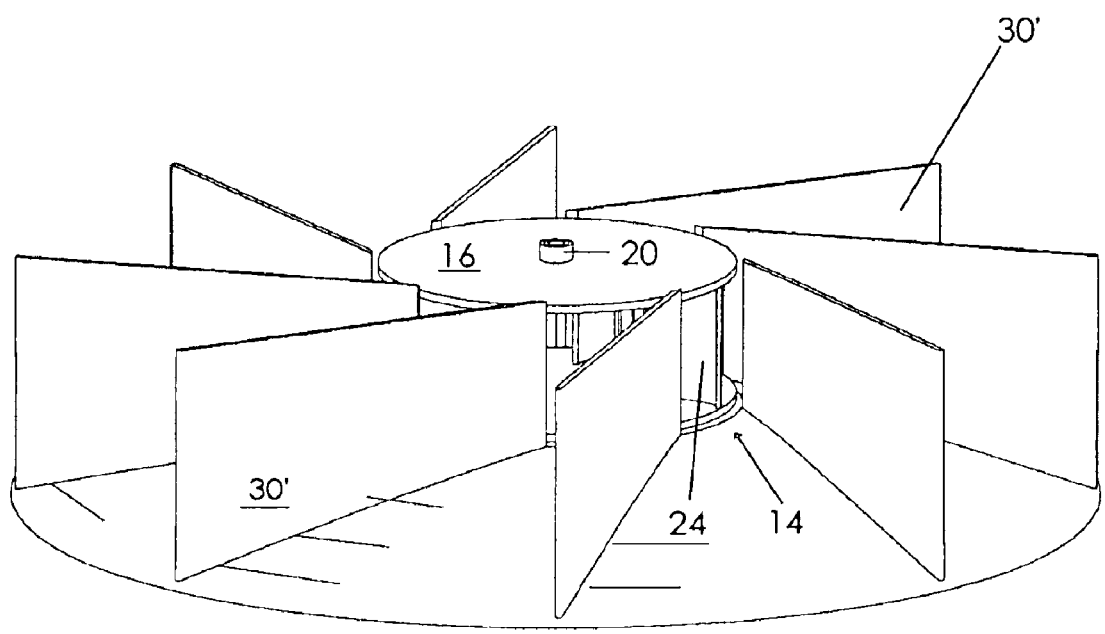
FIG. 5 is a perspective view of the lowermost rotor assembly and corresponding stator blades removed from the wind turbine as in FIG. 1.
Figure 6:
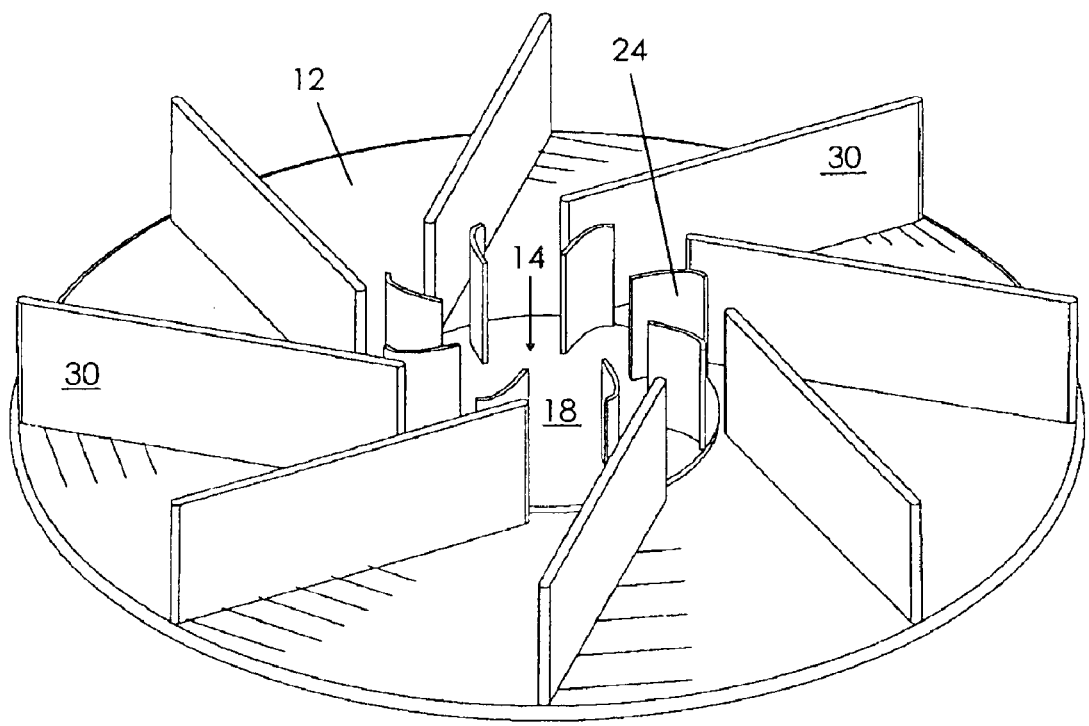
FIG. 6 is a perspective view of the rotor assembly and corresponding stator blades as in FIG. 4 with the top plate of the rotor assembly removed.
Figure 7:
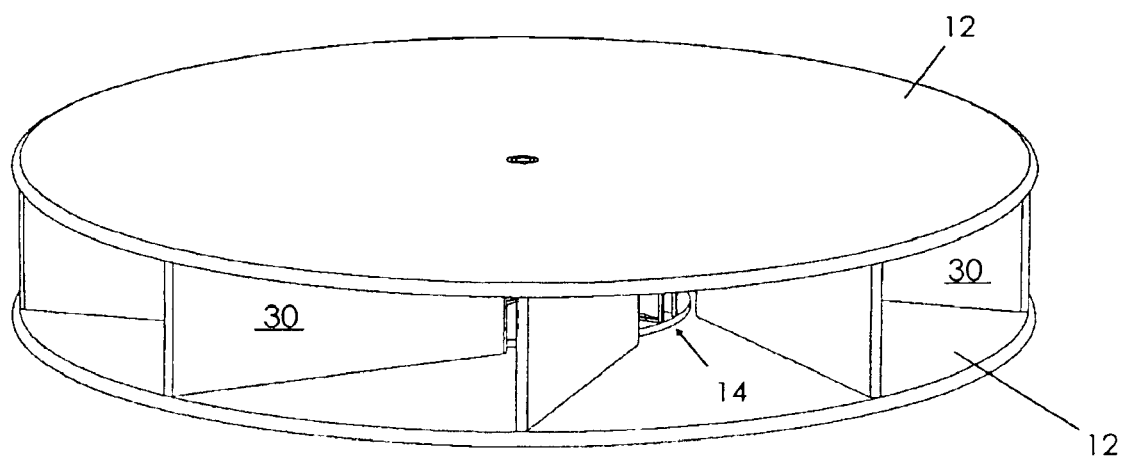
FIG. 7 is a single stage of the wind turbine as in FIG. 1 removed from the housing.
Figure 8:
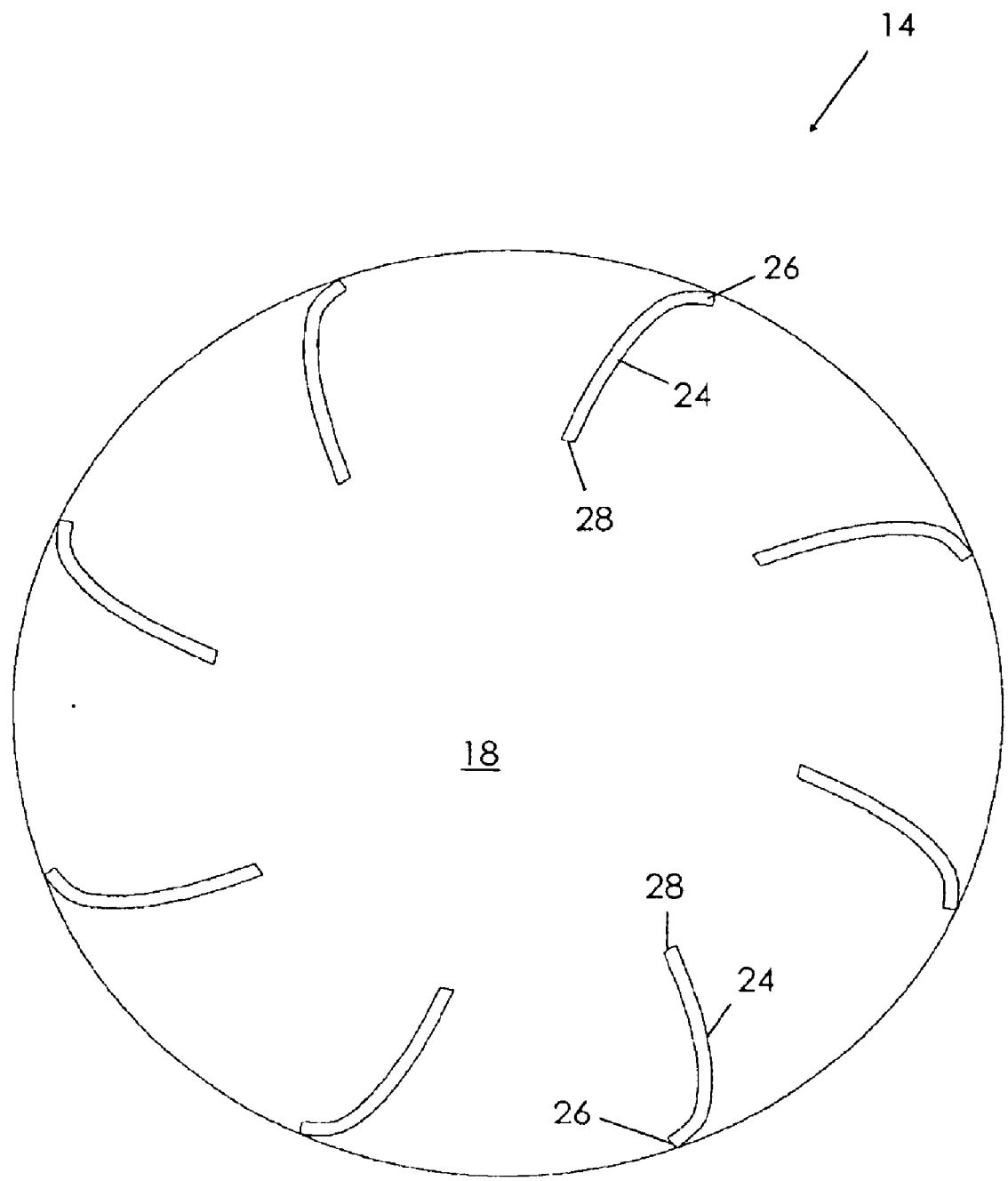
FIG. 8 is a top view of the rotor assembly removed from the separator plate of FIG. 6.

A vertical-axis wind turbine 10 according to one embodiment of the present invention is shown in FIGS. 1 through 10 and includes a housing having a plurality of spaced apart separator plates 12, the separator plates each having a circular configuration and being arranged in a parallel, stacked configuration (FIGS. 1–3). It is understood that the separator plates 12 may have other configurations, such as octagonal (FIG. 13), square (FIG. 14), or other suitable planar configurations. The separator plates 12 act as a ceiling and base to multiple vertically adjacent rotor assemblies positioned therebetween, as to be described in more detail below. It should also be appreciated that while the wind turbine 10 preferably includes multiple rotor assemblies (FIGS. 1–3), a single stage design would also work (FIG. 7). In a single stage design, the separator plates serve as a ceiling and base.

Figure 4:
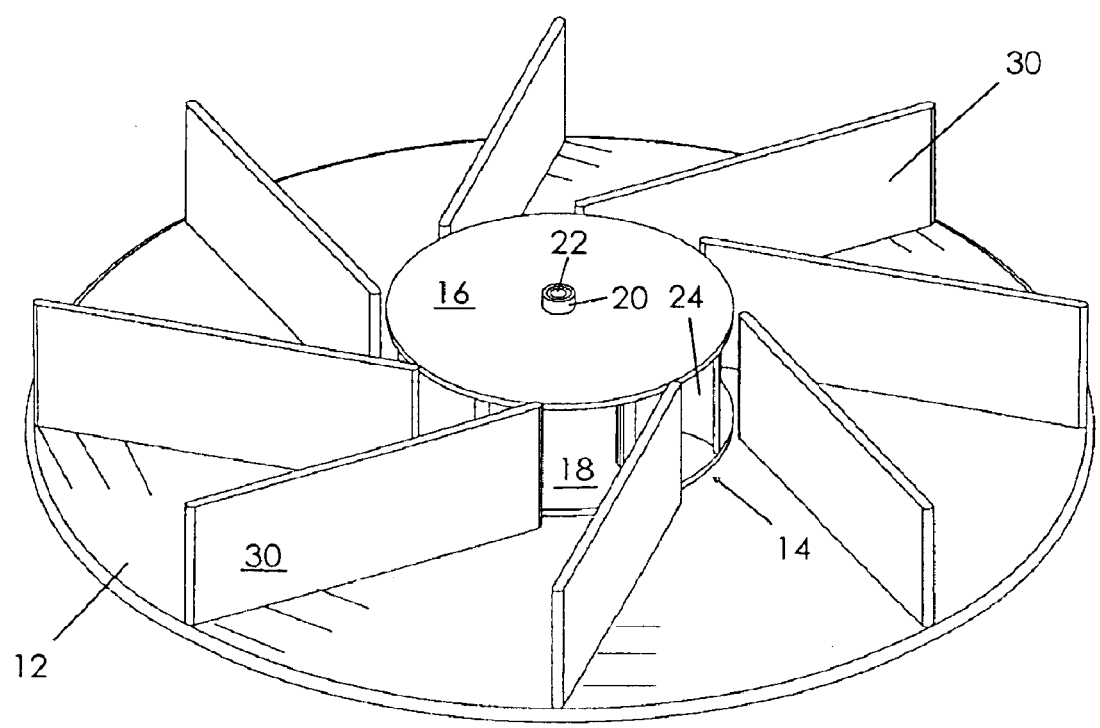
FIG. 4 is a perspective view of a rotor assembly and corresponding stator blades removed from a wind turbine housing as in FIG. 1.
Figure 9:
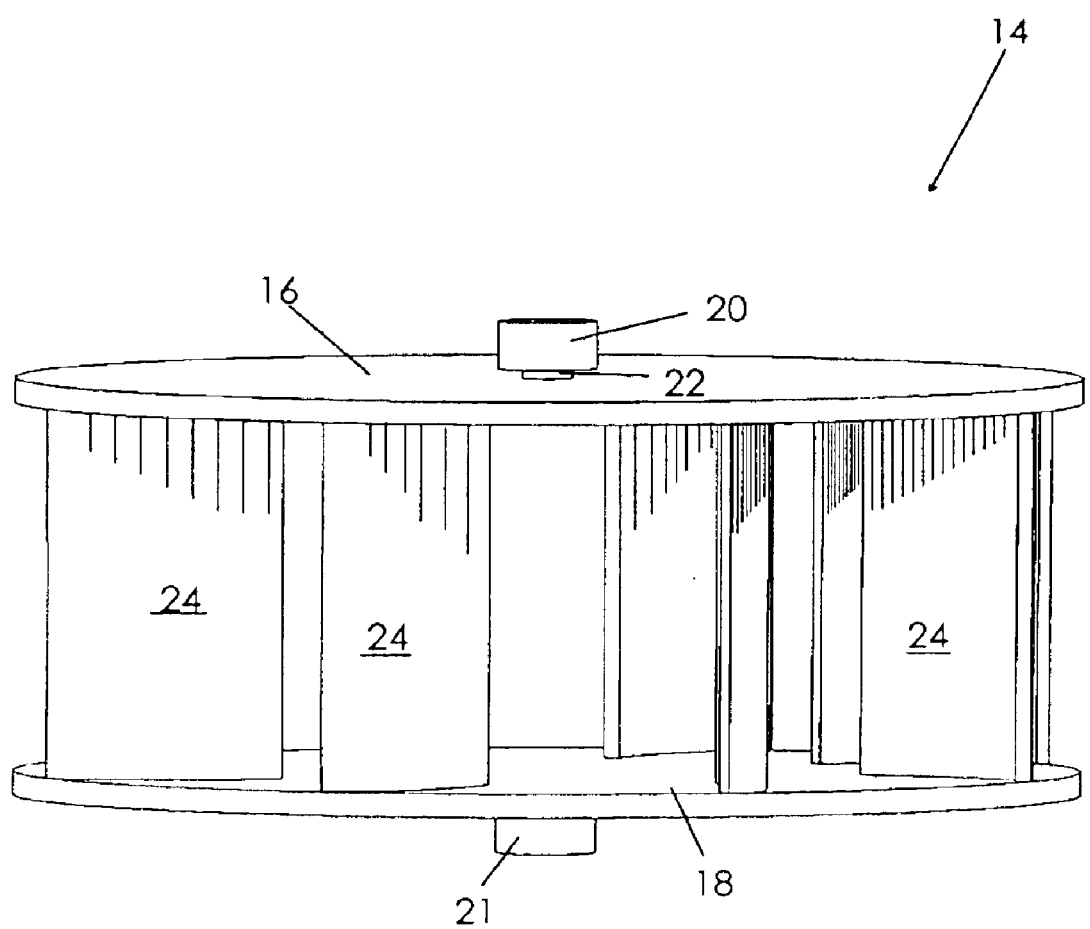
FIG. 9 is a side view of the rotor assembly removed from the separator plate of FIG. 4.
Figure 10:
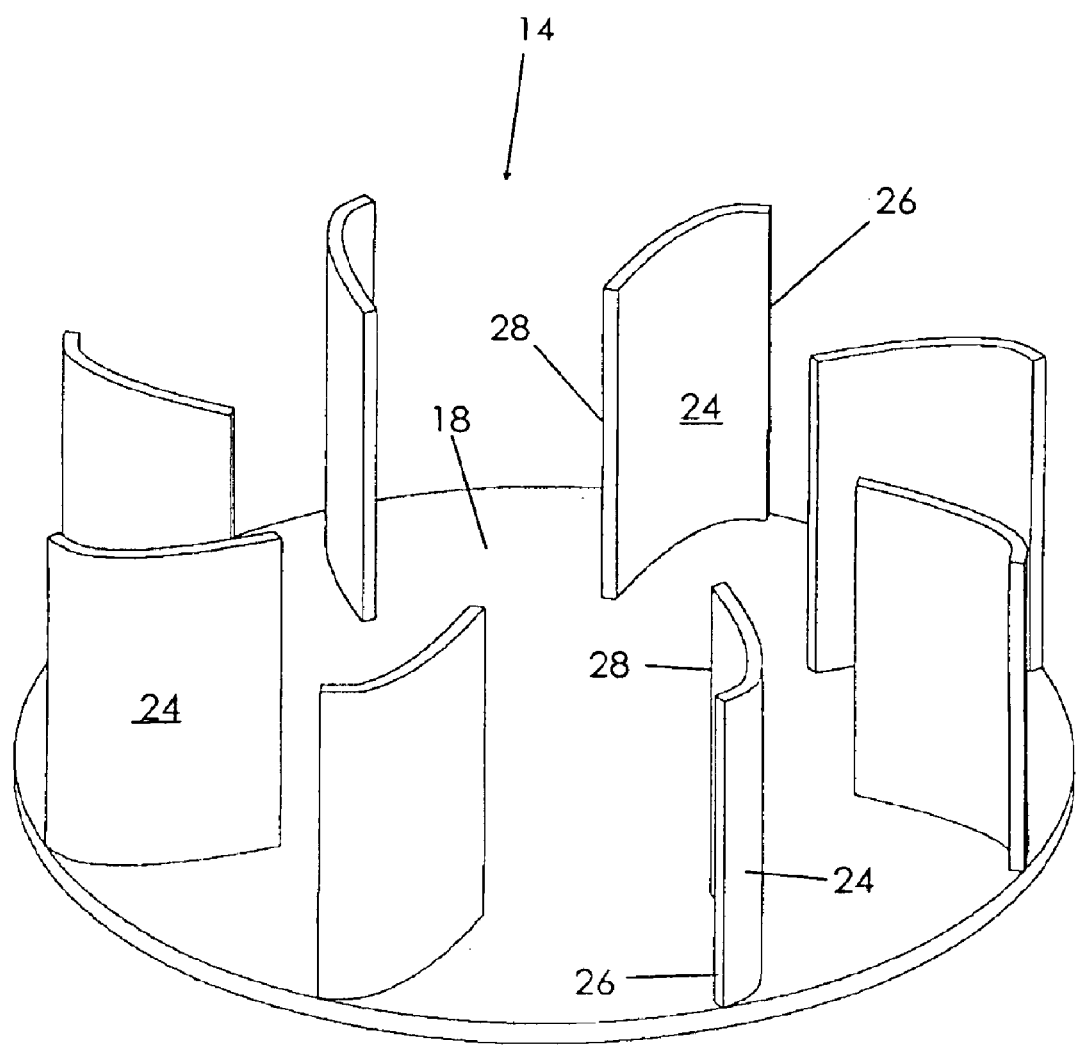
FIG. 10 is a perspective view of the rotor assembly as in FIG. 8.

The wind turbine 10 includes a rotor assembly 14 positioned between adjacent separator plates 12 (FIG. 2). Each rotor assembly 14 includes spaced apart top 16 and bottom 18 walls, the top 16 and bottom 18 walls having circular configurations. Outer surfaces of each top 16 and bottom 18 wall are rotatably coupled to respective separator plates 12 with upper 20 and lower 21 bearing hubs (FIGS. 2, 4, 9). These hubs enable a rotor assembly 14 to rotate freely about an imaginary vertical axis extending between corresponding hubs as an airflow passes therethrough, as to be described in more detail below. The upper 20 and lower 21 hubs will hereinafter be referred to generically with reference numeral 20.

Preferably, a diameter of each separator plate 12 is at least three times larger than a diameter of a rotor assembly 14. The ratio of the housing to the rotor assembly is important in that the housing configuration (separator plates) accelerate the air so as to create a higher wind speed before the air enters the rotor assembly 14. Therefore, the larger the housing, the greater the increase in wind speed.

Each rotor assembly 14 includes a plurality of spaced apart rotor blades 24 situated adjacent the radial edges of the top 16 and bottom 18 walls and extending perpendicularly therebetween (FIG. 6). Having eight rotor blades has been determined to provide optimal performance although having between 6 and 10 blades would be adequate. Further, each rotor blade 24 includes a first vertical edge 26 extending between radial edges of respective top 16 and bottom 18 walls. Each rotor blade 24 further includes a second vertical edge 28 parallel to the first vertical edge 26 but spaced inwardly toward the respective imaginary vertical axis of the respective rotor assembly 14. Each rotor blade 24 only extend partially between the radial edges of the top 16 and bottom 18 walls and the respective imaginary vertical axis such that the respective rotor assembly 14 maintains an open center area. The open center area is primarily characterized, of course, by its lack of a center shaft.

In addition, each rotor blade 24 includes an airfoil configuration with a curved portion adjacent the radial edacs 16, 18 of the rotor assembly and a generally linear portion extending inwardly therefrom in a direction toward the imaginary vertical axis wherein the curved portion curves away from the generally linear portion toward an outer circumference of the rotor assembly so as to act as an airfoil under appropriate airflow conditions. More particularly, an airfoil generates lift when the chord line of the airfoil is oriented parallel to the wind. In other words, when an incoming airflow passes over the back side (outwardly curved portion) of an airfoil, low pressure is created which contributes to propulsion. On the other hand, when an incoming airflow strikes the front side (inwardly curved portion) substantially directly, the rotor blade arts as a sail which directly contributes to propulsion.

To generate further lift, each rotor blade 24 is angularly offset from an imaginary radial line extending between the imaginary vertical axis and the respective rotor blade. A large angular offset (e.g. 40°) reduces sail propulsion potential but increases lift potential, and vice versa (e.g. 0°). Preferably, each rotor blade 24 is angularly offset 20° from this imaginary radial line so as to optimize the lift and sail propulsion characteristics of the rotor assembly although other angular offsets are possible.

The wind turbine 10 further includes a plurality of stationary stator blades 30 arranged circumferentially and spaced apart about the rotor assembly 14 (FIG. 6). Each stator blade is upstanding between adjacent separator plates 12 (FIGS. 1 and 2). Each stator blade 30 presents a linear configuration and is positioned tangentially to the radial edge of a rotor assembly 14. This configuration and arrangement allows an airflow to flow directly and unrestricted to a propulsion rotor blade while restricting an airflow that would cause drag on the rotor blade (FIG. 6). It should be appreciated that even when an airflow does not directly impact the first rotor blade toward which it is directed (i.e. there is no "sail" propulsion), the airflow may pass in part along the backside of the rotor blade to promote lift propulsion and then flow directly through the open center area and impact rotor blades along the far side of the rotor assembly for sail type propulsion. At the same time, the stator blades 30 block airflow moving in a direction that would cause drag on the rotor blades 24. By directing a large amount of air into a small opening of a rotor assembly, the air velocity is also increased which enhances propulsion.

Various configurations of the separator plates 12 may be utilized, even within the multi-stage housing shown in FIG. 1. An inwardly sloped separator plate such as the convex lowermost plate shown in FIGS. 1, 2, and 5 allows for the collection of a large amount of air and then compresses/speeds it as it flows into the respective rotor assembly. Obviously, the stator blades 30' attached thereto will have a variable height as a result (FIG. 5). The convex configuration is also advantageous in that an electrical generator 40 may be positioned therein and coupled to the rotating bearing hubs 20. The parallel configuration of the intermediate and uppermost separator plates is advantageous in that they are simple to manufacture and conducive to stacking.

As previously mentioned, a generator 40 capable of converting rotational mechanical energy to electric energy is coupled to the lowermost bearing hub (FIGS. 2 and 3). Each hub includes a shaft 22 that extends through a respective separator plate 12 and connects to the next adjacent hub such that adjacent rotor assemblies are linked together. Therefore, the mechanical energy of all the rotor assemblies may be harnessed by the generator 40.

A measurement module 42 may be electrically connected to the generator 40 for calculating the amount of electrical power generated by the generator 40 (FIGS. 2 and 3). Such a measurement is calculated as the mathematical product of voltage and current produced by the generator 40. Alternatively, the amount of mechanical power generated by the rotor assemblies may be calculated using conventional load cells or strain gauges (not shown) which produce an electronic signal proportionate to the force on the respective sensor. A pulley system whereby the rotor assemblies lift a weight would also be suitable, the power calculation revealing the number of watts produced. Other suitable measurement options would be a digital handheld tachometer or digital bicycle speedometer to measure rpm's or speed, respectively.

Although the uppermost rotor assembly is sandwiched between parallel separator plates 12, a roof 50 having a dome-shaped configuration may be fixedly attached to the uppermost separator plate for deflecting weather elements away from the housing and rotor assemblies (FIG. 2).

In operation, an airflow is naturally harnessed between adjacent separator plates 12 and between respective stator blades 30. This airflow is naturally compressed by the configuration of the separator plates 12 and placement of the stator blades 30 such that the velocity of the airflow is increased before entering a respective rotor assembly 14. The tangential placement of stator blades 30 also blocks an airflow that is flowing in such a direction as would cause resistance against the rotating rotor blades 24. The tangential placement of the stator blades 30 will either direct the airflow into direct contact with the front face of a rotor blade 24 and cause sail-type propulsion or will be diverted around the rotor blade 24 and cause lift-type propulsion, depending upon the exact position of the rotor blade 24 at the time. If the airflow is diverted, it flows without obstruction through the rotor assembly 14 until it contacts a far-side rotor blade for sail-type propulsion. The center of the rotor assembly 14 does not include a center shaft; therefore, efficient conversion of airflow energy to propulsive rotational energy is not hampered or decreased by unnecessary resistance. The configuration of each rotor blade 24 is like an airfoil and is angularly diverted to optimize both sail-type and lift-type propulsive effects. The rotor assemblies are connected to the electric generator 40 for converting airflow energy to electric energy.

Figure 11:
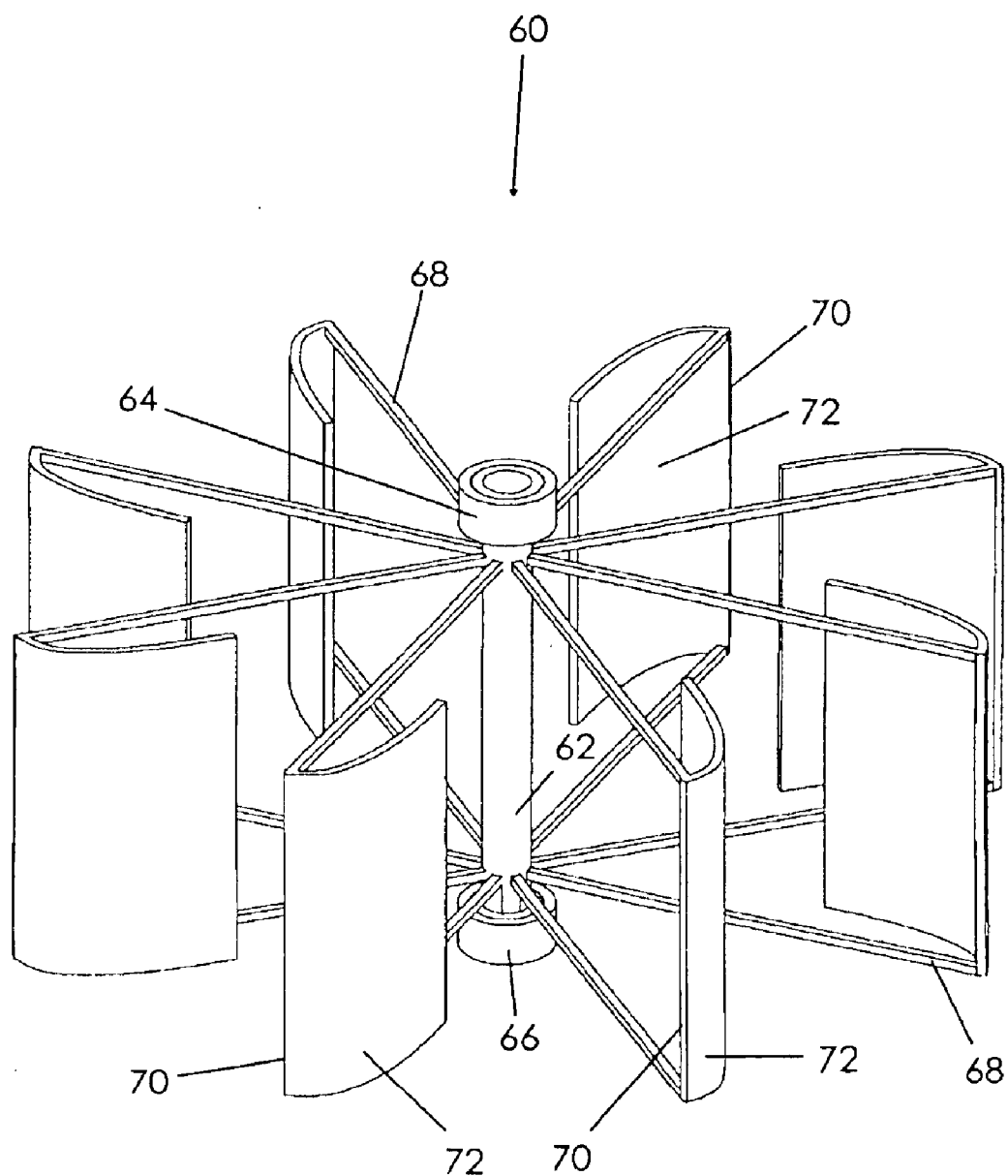
FIG. 11 is a perspective view of a rotor assembly according to another embodiment of the present invention.

Another embodiment of a rotor assembly 60 for use in a vertical-axis wind turbine according to the present invention is shown in FIG. 11 and includes a construction that is substantially similar to the rotor assembly construction described above except as noted below. In this rotor assembly 60, a center shaft 62 extends between upper 64 and lower 66 bearings and a plurality of spokes 68 extend radially from the center shaft 62. Radial ends of the spokes 68 are fixedly attached to outer vertical edges 70 of respective rotor blades 72. The use of a center shaft 62 makes manufacture of the rotor assembly 60 more cost-effective and simple in that top and bottom walls to support the rotor blades are unnecessary.

Figure 12:
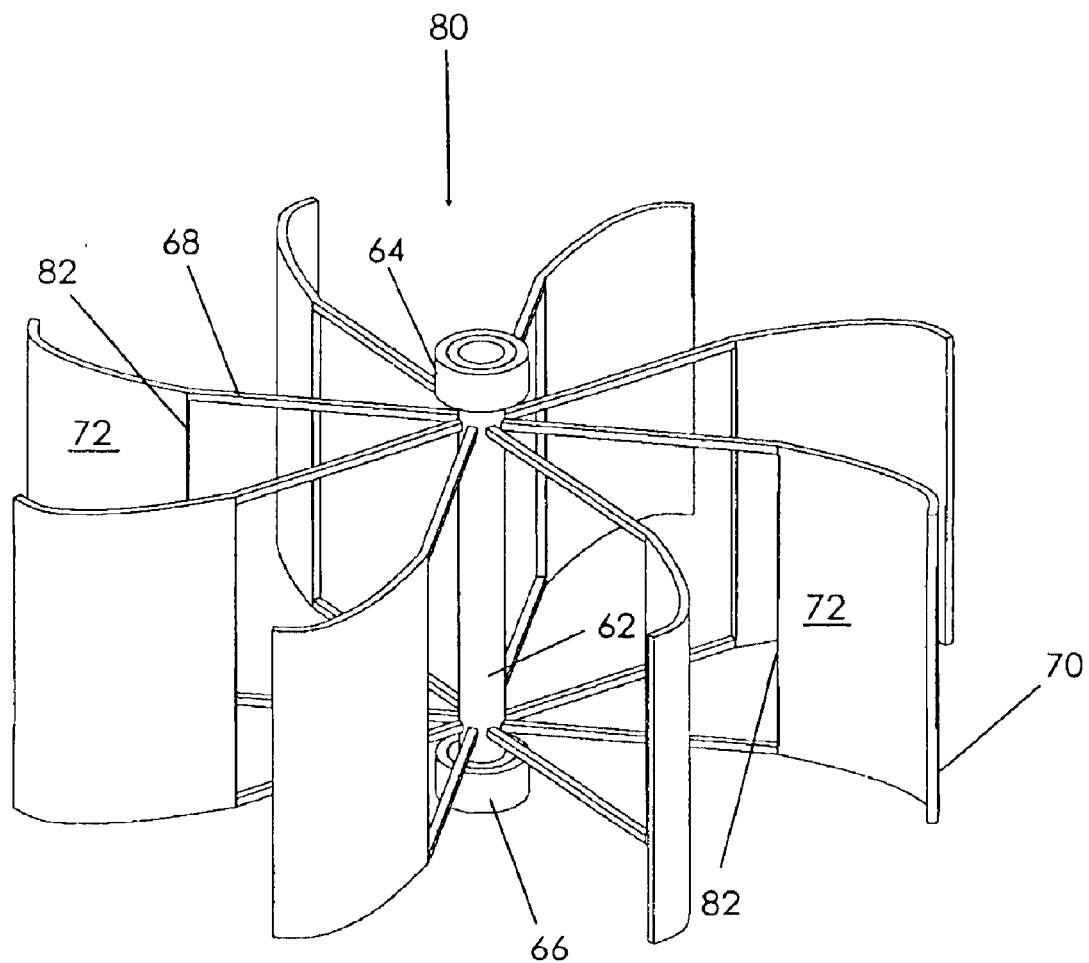
FIG. 12 is a perspective view of a rotor assembly according to still another embodiment of the present invention.
Figure 13:
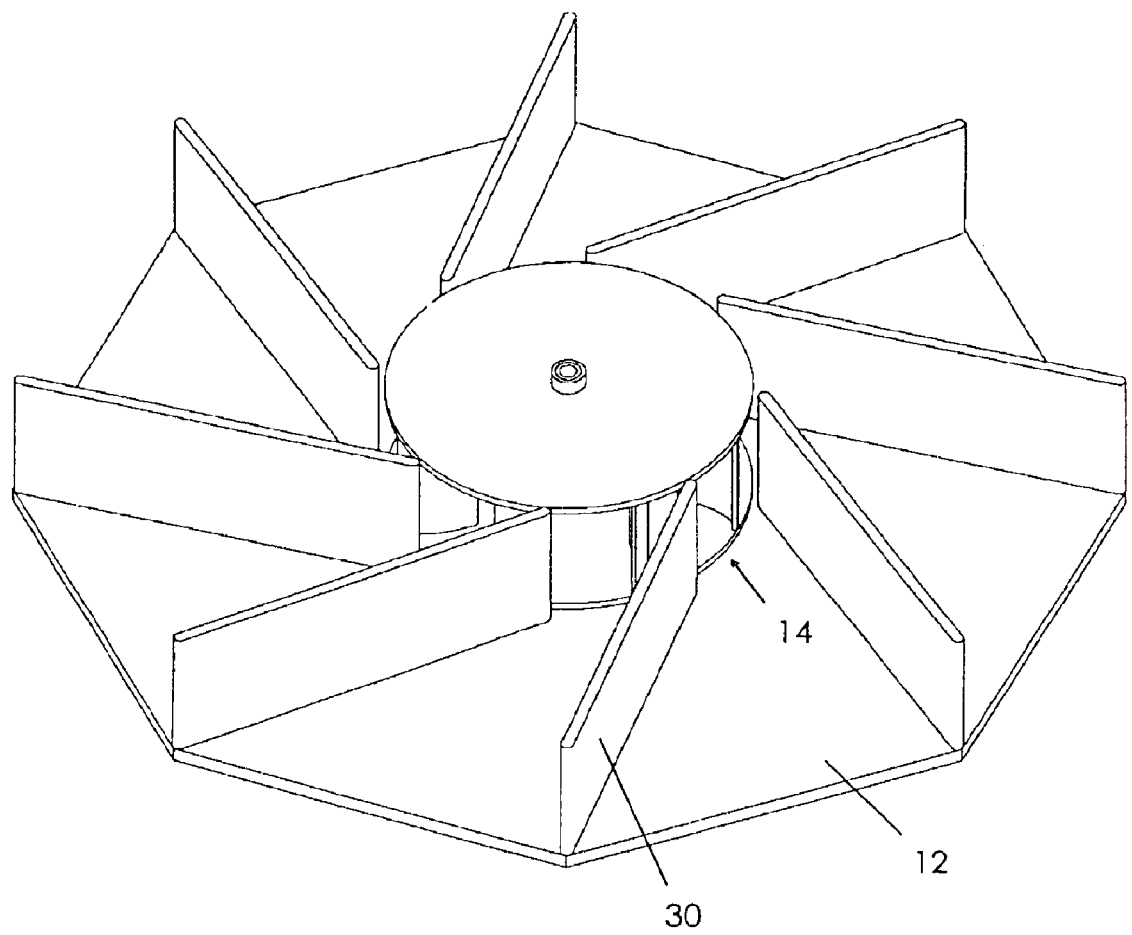
FIG. 13 is a perspective view of a wind turbine housing configuration according to yet another embodiment of the present invention.
Figure 14:
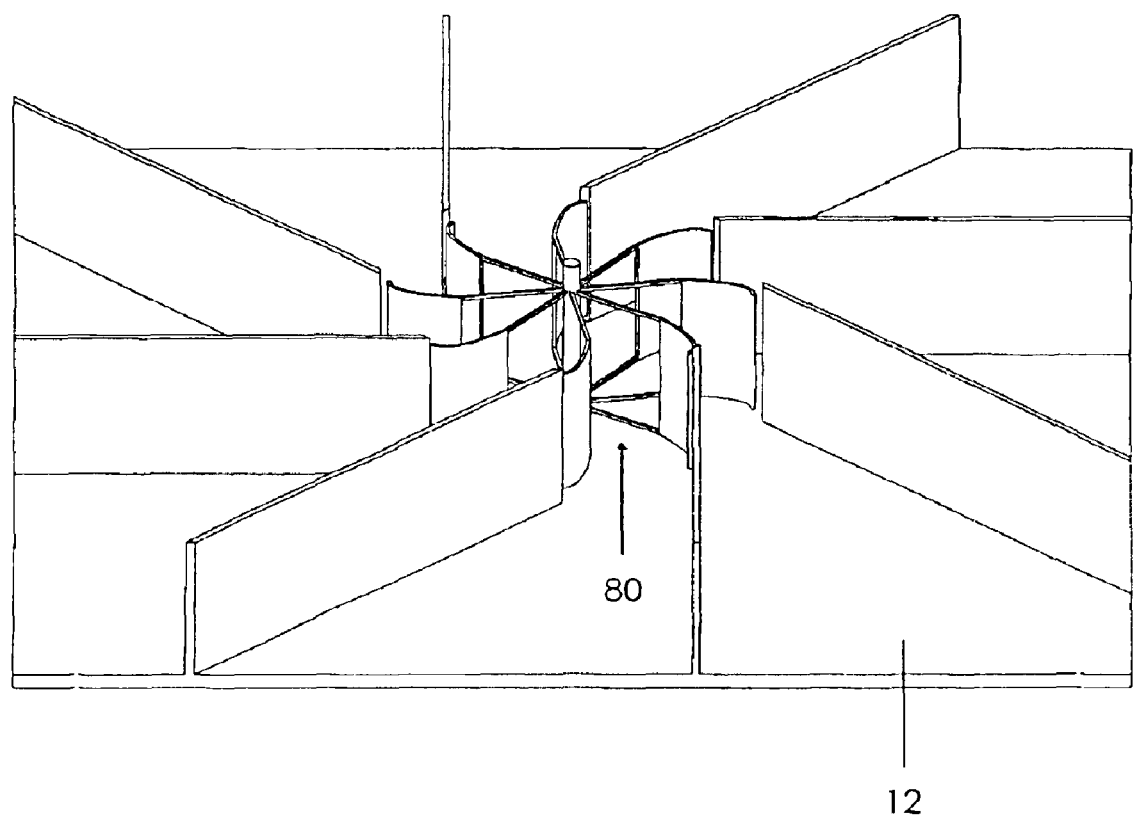
FIG. 14 is a perspective view of a wind turbine housing configuration according to still another embodiment of the present invention.

Another embodiment of a rotor assembly 80 is shown in FIG. 12 that includes a construction substantially similar to that of FIG. 11 except that radial ends of the spokes 68 are fixedly attached to inner vertical edges 82 of respective rotor blades 72. This rotor assembly 80 is shown in use with a housing having a square-shaped separator plate in FIG. 14.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A vertical-axis wind turbine, comprising:
   an upper and lower hub defining an open central space with only an imaginary vertical axis therebetween so that an airflow passing between said upper and lower hubs is unobstructed;
   a rotor assembly rotatably connected to said upper and lower hubs for rotation about said imaginary vertical axis;
   a plurality of spaced apart rotor blades positioned in said rotor assembly, each rotor blade having an airfoil rotor configuration with a curved portion adjacent a radial edge of said rotor assembly and a generally linear portion extending inwardly therefrom in a direction toward said imaginary vertical axis but not contacting any other rotor blade and being displaced from said imaginary vertical axis, said curved portion curves away from the generally linear portion toward an outer circumference of said rotor assembly;
   and a plurality of stationary stator blades arranged circumferentially about said rotor assembly, each stator blade being positioned tangentially to said radial edge of said rotor assembly and spaced apart so as to allow airflow to respective rotor blades that has a propulsive effect thereon and to restrict airflow to said respective rotor blades that has a drag effect thereon.

2. The wind turbine as in claim 1 wherein said rotor assembly includes a top wall spaced from a bottom wall, said top and bottom walls being generally parallel to one another and rotatably coupled to said upper and lower hubs, respectively.

3. The wind turbine as in claim 2 further comprising a housing having a ceiling and a base, said upper and lower hubs being rotatably coupled to said ceiling and base, respectively, said plurality of stator blades being fixedly positioned on said base.

4. The wind turbine as in claim 3 wherein said base is parallel to said ceiling for funneling an airflow into said rotor assembly.

5. The wind turbine as in claim 3 wherein said base includes a convex configuration relative to said ceiling for increasing a velocity of an airflow being funneled into said rotor assembly.

6. The wind turbine as in claim 1 wherein said housing includes a roof attached to said ceiling and having a dome configuration for deflecting weather elements away from said rotor assembly and said plurality of stator blades.

7. The wind turbine as in claim 1 further comprising means for measuring electrical power generated by rotation of said rotor assembly.

8. The wind turbine as in claim 1 wherein said rotor assembly is adapted to be connected to an electrical generator.

9. A vertical-axis wind turbine, comprising:
   a housing having a plurality of vertically spaced apart separator plates parallel to one another;
   a plurality of rotor assemblies, each rotor assembly having a top wall spaced from a bottom wall with said top and bottom walls being rotatably coupled to respective separator plates with upper and lower bearing hubs, respectively, each upper and lower bearing hub defining an open center area with only an imaginary vertical axis therebetween such that an airflow passing therebetween is unobstructed;
   a plurality of rotor blades positioned in each rotor assembly, each rotor blade having an airfoil configuration with a curved portion adjacent a radial edge of a respective rotor assembly and a generally linear portion extending inwardly therefrom in a direction toward a corresponding imaginary vertical axis but not contacting any other rotor blade, said curved portion curves away from the generally linear portion toward an outer circumference of said rotor assembly; and
   a plurality of stationary stator blades extending between adjacent separator plates and arranged circumferentially about corresponding rotor assemblies, each stator blade being positioned tangentially to said radial edge of a respective rotor assembly and spaced apart so as to allow airflow to respective rotor blades from a direction that has propulsive effect thereon and to restrict airflow to said respective rotor blades from a direction that has a drag effect thereon.

10. The wind turbine as in claim 9 wherein a lowermost separator plate includes a convex configuration relative to a next upwardly adjacent separator plate for increasing a velocity of an airflow through a corresponding rotor assembly.

11. The wind turbine as in claim 9 wherein each respective rotor blade is angularly offset about twenty degrees relative to a corresponding imaginary radial line extending between a corresponding imaginary vertical axis and said respective rotor blade, whereby to optimize propulsion characteristics of said respective rotor blade.

12. The wind turbine as in claim 9 wherein said housing further includes a roof fixedly attached to an uppermost separator plate and having a dome configuration for deflecting weather elements from said plurality of rotor assemblies and stator blades.

13. The wind turbine as in claim 9 wherein said plurality of rotor assemblies are adapted to be coupled to an electric generator; said wind turbine further comprising means for measuring an amount of electric power generated by rotation of said plurality of rotor assemblies.

14. The wind turbine as in claim 9 wherein each respective rotor assembly includes:

a shaft extending between corresponding upper and lower hubs, said each respective rotor assembly adapted to rotate about said shaft; and a plurality of spokes extending between said shaft and respective second vertical edges of said plurality of rotor blades of said respective rotor assembly, each of said plurality of rotor blades having an annular configuration, whereby to optimize lift and sail propulsion characteristics of said plurality of rotor blades.

15. The wind turbine as in claim 9 wherein a lowermost separator plate includes a circular configuration.

16. The wind turbine as in claim 9 wherein a lowermost separator plate includes an octagonal configuration.

17. The wind turbine as in claim 9 wherein a lowermost separator plate includes a square configuration.

18. The wind turbine as in claim 9 wherein a diameter of each separator plate is at least three times larger than a diameter of each rotor assembly.

* * * * *